Dec. 25, 1951           W. M. LEEDS           2,580,354
CIRCUIT BREAKER WITH DISCONNECT
Original Filed June 25, 1946           3 Sheets-Sheet 1
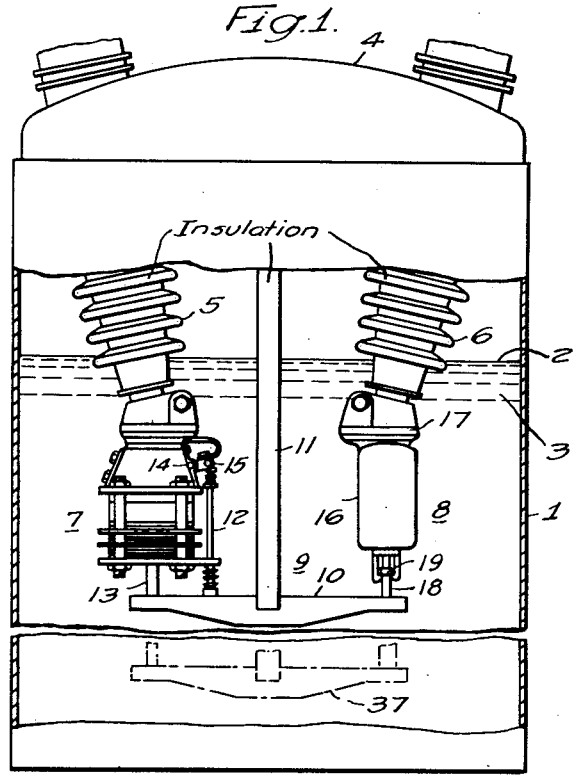
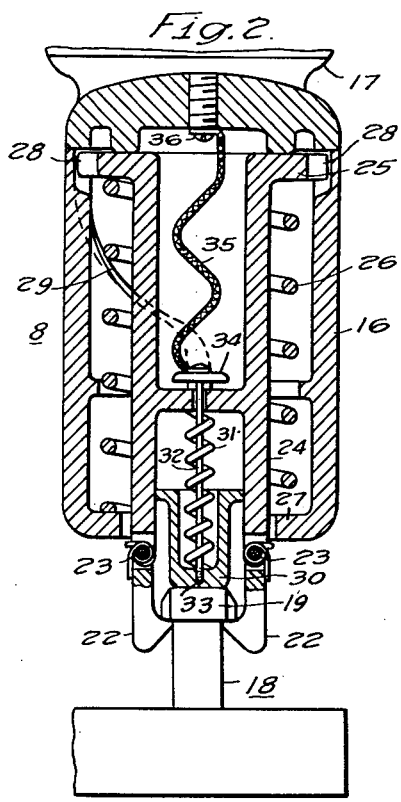
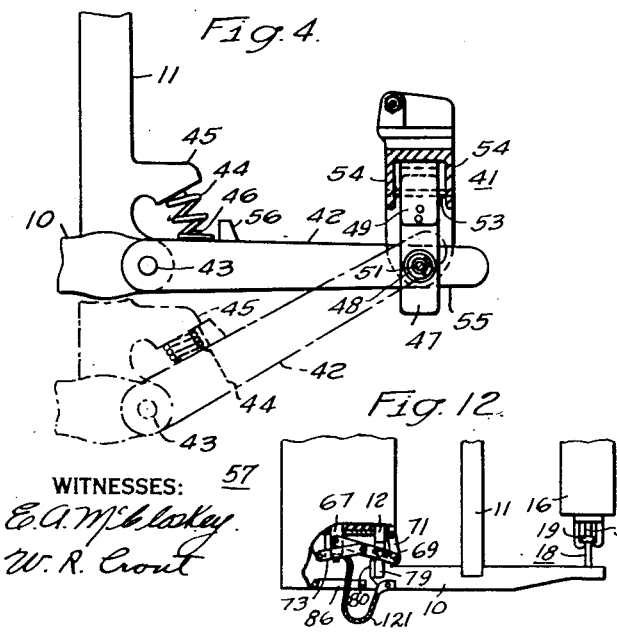
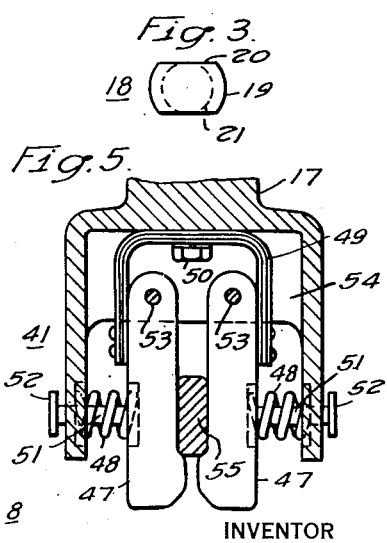
WITNESSES:
INVENTOR
Winthrop M. Leeds.
BY
ATTORNEY

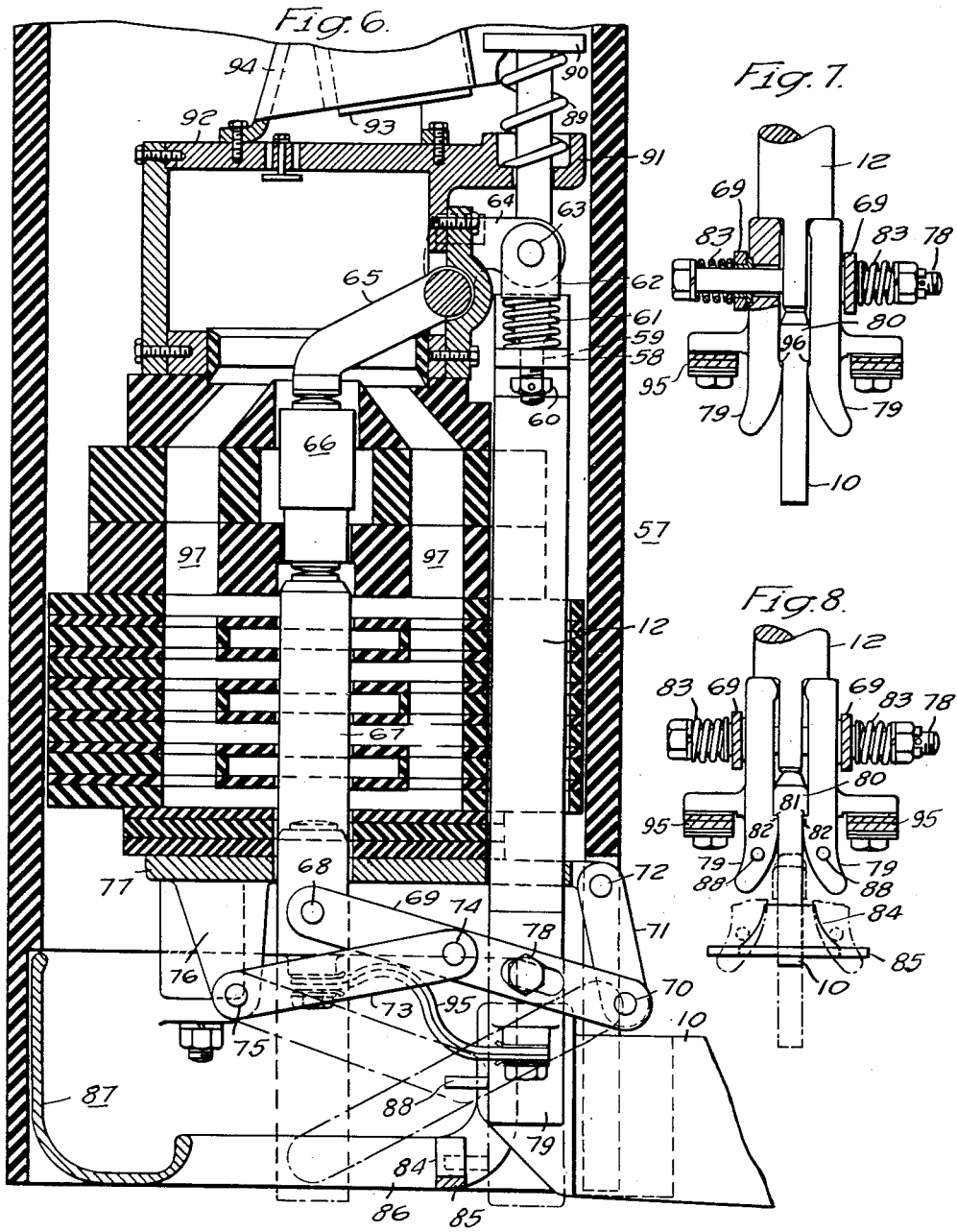

Dec. 25, 1951 W. M. LEEDS 2,580,354
CIRCUIT BREAKER WITH DISCONNECT
Original Filed June 25, 1946 3 Sheets-Sheet 3
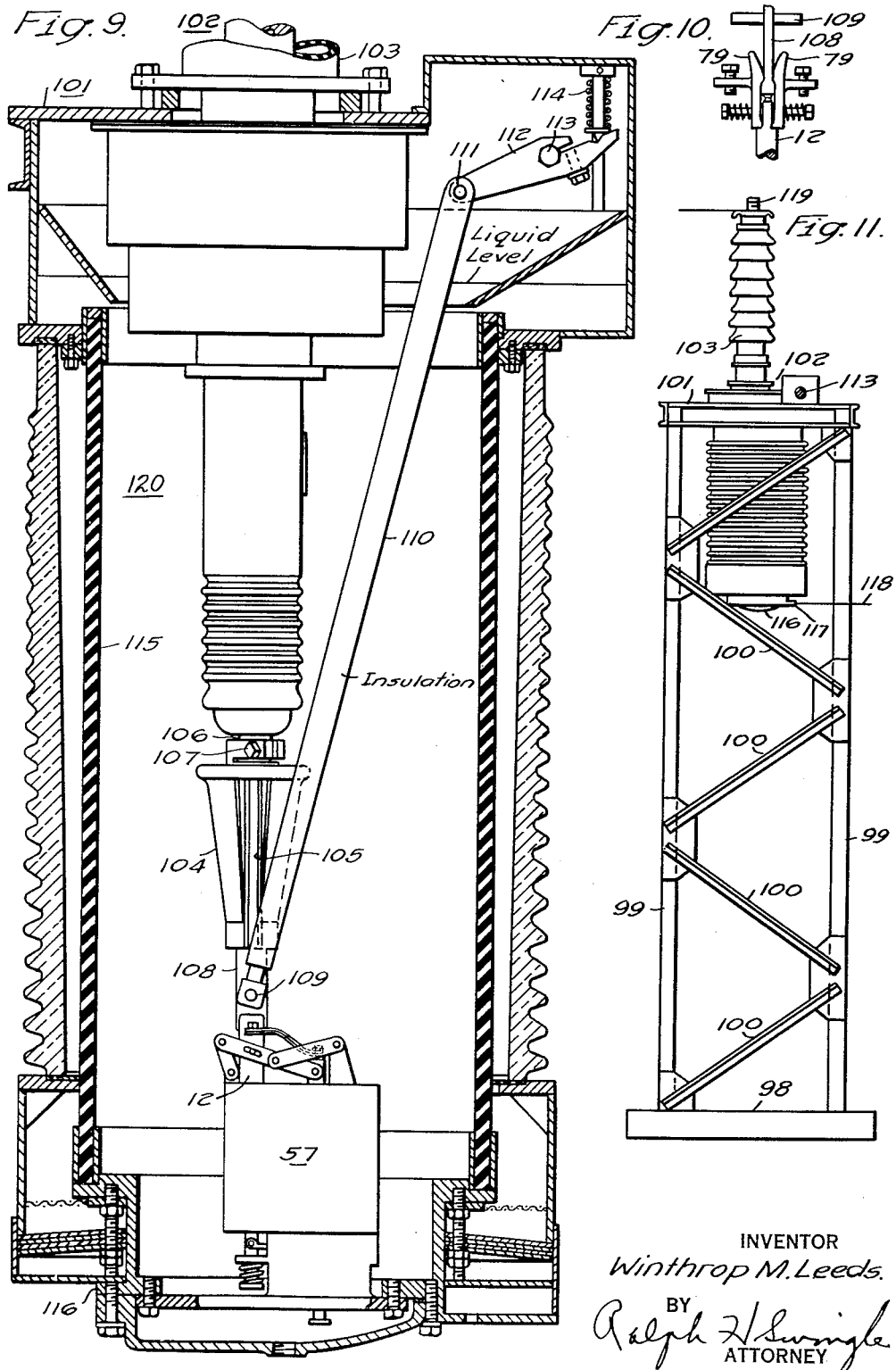
INVENTOR
Winthrop M. Leeds.
BY
Ralph H. Swingle
ATTORNEY

UNITED STATES PATENT OFFICE 2,580,354

CIRCUIT BREAKER WITH DISCONNECT

Winthrop M. Leeds, Pittsburgh, Pa., assignor to Westinghouse Electric Corporation, East Pittsburgh, Pa., a corporation of Pennsylvania Continuation of application Serial No. 679,087, June 25, 1946. This application July 8, 1949, Serial No. 103,683

18 Claims. (Cl. 200—150)

This invention relates to circuit interrupters, in general, and more particularly to arc extinguishing structures and disconnect means therefor.

This is a continuation of my application, filed June 25, 1946, Serial No. 679,087 now abandoned and assigned to the assignee of this invention.

Circuit interrupters are not only used in a transmission system or other electrical network for disconnecting normal loads or for line dropping operations, but they are also used to provide protection during the existence of faults on the line. For example, a line may be broken and fall to the ground, thereby imposing a very high short circuit upon the system. The circuit interrupter must be designed to disconnect that flow of power from such a grounded line. It is apparent that in such a case if the circuit interrupter were reclosed, the fault would still exist upon the line.

However, it may occur that lightning will strike a transmission line and cause current to flash over one or more suspension insulators associated with the line. In such a case the passage of a considerable amount of current over the insulator to the ground will temporarily cause a portion of the line to be at ground potential. Since a portion of the line would then be at ground potential, short circuit current would flow which would cause the opening of the circuit interrupter. If, now, the circuit interrupter is reclosed, the ionized path over the insulators will have disappeared by this time and service will be restored. Thus, in order to maintain continuity of service to the consumer using current from such a system, it is desirable to have the circuit interrupter immediately reclose following a fault condition. If, as in the first case mentioned above, the transmission line actually has broken and is permanently at ground potential, no number of reclosing operations will suffice to restore service. Thus, after a predetermined number of reclosing operations the circuit interrupter is locked open and remains open until the station attendant investigates the matter to remedy the fault condition.

Should, however, lightning have struck the transmission line and merely flashed over the insulation, service may be restored inasmuch as the fault condition is only temporary. It is thus with the hope of there existing merely a momentary fault condition that reclosing operations are provided in a circuit interrupter. It is to be observed, however, that if the fault condition still exists, there may occur arcing as the contacts approach one another during such closing operation. This results inasmuch as one side of the interrupter will be at ground potential; whereas the other side of the interrupter may be at a high potential. Such arcing following "prestriking" during the closing stroke as the contacts near one another tends to contaminate the oil or fluid within the interrupter for the next reopening operation.

There is no way for the circuit interrupter to know whether the fault condition is permanent, as is the case with a broken line, or whether the fault condition is momentary, as is the case with lightning flashing over the transmission line insulation. Thus, reclosing operations are required in all cases in the hope that in many of the cases the fault may be momentary and service immediately restored to the consumer.

Immediately following the interruption of an arc in an arc extinguishing unit, an appreciable time interval must elapse before contaminating gas is completely vented and the arcing space refilled with oil. If the contacts are immediately reclosed during this interval, there will be the possibility of prestriking of the arc over a considerable gap in the event that a short circuit still exists on the system. It has been found that such prestriking results in longer arcing and greater arc energy in the second interruption that follows immediately.

My invention provides an uncontaminated series gap of high dielectric strength regardless of the condition of the interrupting chamber so that prestriking on reclosing will be negligible. Excessive prestriking will also be avoided on normal closing operations if the arc extinguishing chamber should develop carbon-coated creepage surfaces due to repeated duty without adequate maintenance.

It is desirable for simplification in circuit breaker design and reduction in maintenance expense to reduce the number of series interrupters per pole, but this results in an increase in the voltage gradient in the contact gap. This would make excessive prestriking of the arc more likely to occur on rapid reclosing duty cycles. Such prestriking tends to reduce the effectiveness of the interrupter for a subsequent immediate arc interruption. My invention concerns numerous design features which are desirable to obtain maximum interrupting effectiveness in a high voltage circuit breaker, especially adaptable for circuit breakers of the liquid break type, having high speed reclosing duty cycles.

A general object of my invention is to provide an improved circuit interrupter in which interruption of the circuit takes place within an arc extinguishing unit, during which time the serially-related disconnect means remains closed. Following interruption of the circuit within the unit, opening of the disconnect means then takes place.

Another object is to provide an improved circuit breaker including two serially related arc extinguishing units. Preferably I effect reclosure of the contact structure within the units following opening of the circuit, so that during the closing operation the two isolating gaps are cooperable to hold considerable voltage during such closing operation.

Another object is to provide an improved circuit interrupter having a conducting cross-bar electrically interconnecting an arc extinguishing unit and serially related disconnect means. Preferably the conducting cross-bar includes a pivoted blade so that the disconnect means remains closed while the circuit is broken within the arc extinguishing unit.

Another object is to provide an improved circuit interrupter of the type having disconnect means in series with the arc extinguishing unit, and in which a movable disconnect contact moves during the opening operation to thereby maintain the circuit closed at the disconnect means while it is being broken within the unit. Preferably means are included for retrieving the movable disconnect contact following opening of the disconnect means.

Another object of my invention is to provide an improved circuit interrupter of the single bushing type in which the contact structure within the arc extinguishing unit is reclosed following a circuit opening operation. Consequently, the circuit is reclosed exteriorly of the unit so that the fluid within the unit cannot become contaminated as a result of prestriking.

Another object is to provide an improved arc extinguishing unit having disconnect contacts serving the function of opening the contact structure within an arc extinguishing unit. The interconnection between the disconnect contacts and the contact structure within the unit may be either positive and released by cam action, or the interconnection may be merely frictional in nature.

Further objects and advantages will readily become apparent from the reading of the following specification taken in conjunction with the drawings, in which:

Figure 1 is a side elevational view, partly in section, of a circuit interrupter embodying my invention and shown in the closed circuit position;

Fig. 2 is an enlarged vertical sectional view through the disconnect means employed in the interrupter shown in Fig. 1;

Fig. 3 is a plan view of the latch head employed in Fig. 2;

Fig. 4 is a modified type of disconnect means incorporating a pivoted blade construction, which may be used in place of the disconnect means utilized in Fig. 1;

Fig. 5 is an enlarged end elevational view of the modified type of disconnect means shown in Fig. 4;

Fig. 6 shows a modified type of circuit interrupter involving an arc extinguishing unit which is reclosed following the opening operation;

Fig. 7 shows a modified type of frictional finger construction, which may be used in place of the finger construction employed in the unit shown in Fig. 6;

Fig. 8 is an end elevational view of the finger construction actually used in the unit of Fig. 6;

Fig. 9 is an elevational view, partly in section, of a modified type of circuit interrupter embodying my invention, the parts being shown in the closed circuit position;

Fig. 10 is an enlarged fragmentary view of the disconnect contact structure used in the interrupter shown in Fig. 9;

Fig. 11 is an elevational view of the complete circuit interrupter of Figs. 9 and 10, the interrupter being of the single bushing type; and Fig. 12 shows a further form of circuit interrupter embodying my invention.

Referring to the drawings, and more particularly to Fig. 1 thereof, the reference numeral 1 designates a tank filled to the level 2 with a suitable arc extinguishing fluid 3, in this instance circuit breaker oil. Depending from the cover 4 of the tank 1, are two terminal bushings 5, 6, to the lower ends of which are respectively appended an arc extinguishing unit 7 and disconnect means 8. Conducting means 9, in this instance comprising a conducting cross-bar 10, electrically interconnects the unit 7 and disconnect means 8 in series circuit in the closed circuit position, as shown by the full lines of Fig. 1. An insulating operating rod 11 is connected to the cross-bar 10 intermediate the ends thereof for causing actuation of the same in a vertical direction. The operating rod 11 is connected at its upper end to suitable mechanism, not shown.

The unit 7 is of the type which establishes a pressure-generating arc and an interrupting arc substantially simultaneously. An operating rod 12 which moves downwardly during the opening stroke with the lower movable contact 13 rotates a pivotally mounted pressure-generating contact in a clockwise direction about the pivotal point 14 away from an intermediate contact, not shown, to establish a pressure-generating arc within the unit 7. The movable contact 13, during the opening operation, also separates substantially simultaneously from the intermediate contact to establish an interrupting arc. Fluid flow under pressure, generated at the pressure-generating arc, passes through suitable passages toward the interrupting arc to effect the extinction of the same. The intermediate contact, the pressure-generating contact and the fluid flow passages are similar to those shown in Fig. 6 hereinafter described.

The particular unit 7 of Fig. 1 is described and claimed in U. S. patent application, filed November 11, 1942, Serial No. 465,244, now U. S. Patent 2,406,469, issued August 27, 1946 to Leon R. Ludwig, Winthrop M. Leeds and Benjamin P. Baker, and assigned to the assignee of the instant application. Reference may be had to the aforesaid application for the internal constructional details. For the purposes of this application, it is sufficient to state that the lower movable contact 13 separates from an intermediate contact, not shown, substantially simultaneously with the separation from the intermediate contact of the upper pivotally mounted pressure-generating contact, which is pivotally mounted at 14 and actuated externally of the unit 7 by integrally formed actuating arms 15, the latter being actuated by the insulating operating rod 12. The lower movable contact 13 is completely withdrawn from the unit in the open circuit position.

The disconnect means 8 is more clearly set forth in Figs. 2 and 3. The disconnect means 8 includes a metallic housing 16 secured by means, not shown, to the foot 17, the latter being threadedly secured and clamped to the lower end of the terminal stud which passes interiorly through the terminal bushing 6. A movable disconnect contact 18 has a latch head 19 integrally formed therewith, the latter having a configuration more clearly shown in Figs. 2 and 3. The latch head 19, as viewed in Fig. 3, is cut away on two sides 20 to the width of the stem 21 so that releasing action may take place upon rotative movement of the latch hooks 22. The latch hooks 22 are pivotally mounted on pins 23 to a cylindrical member 24, the latter having a flange portion 25 at its upper end. A retrieving compression spring 26 has its upper end resting against the flange portion 25 and its lower end resting against an inwardly extending portion 27 of the housing 16.

Integrally formed with the flange portion 25 are two offstanding pins 28, diametrically oppositely positioned, and movable in two curved cam slots 29 machined on the interior surface of the housing 16, and only one of which is shown in Fig. 2. From the foregoing description, it will be apparent that upon downward movement of cylindrical member 24 and correspondingly downward movement of the latch hooks 22, the pins 28 sliding in the two cam slots 29, will cause the latch hooks 22 to rotate substantially 90° about an axial direction to thereby effect release of the latch head 19. Thus, I provide a positive engagement between the latch head 19 and the latch hooks 22 until such time as the cylindrical member 24 is rotated to such an extent as to effect releasing engagement between the latch hooks 22 and the latch head 19.

When this releasing action takes place, the movable disconnect contact 18 continues its downward movement independently of the latch hooks 22, which, together with the cylindrical member 24, are retrieved to their upper position, as shown in Fig. 2, by the retrieving spring 26.

Preferably, I provide a cup-shaped movable disconnect contact 30, which makes good contacting engagement with the movable disconnect contact 18 by virtue of a compression spring 31 encircling a stud 32, and having its lower end threadedly secured at 33 to the movable disconnect contact 30. A stop cap 34 is secured to the upper end of the stud 32. A flexible conductor 35 is secured to the stud 32 at one end and to a screw 36 at its other end, the screw 36 being threadedly secured into the contact foot 17.

From the foregoing description, it will be apparent that the electrical circuit through the interrupter passes downwardly through the terminal stud within the terminal bushing 5 and through the contact structure associated with the unit 7, through movable contact 13, conducting cross-bar 10, movable disconnect contacts 18, 30, stud 32, flexible conductor 35, screw 36, contact foot 17 to the terminal stud (not shown), which is positioned interiorly of the terminal bushing 6.

To open the electrical circuit, suitable means (not shown) cause downward movement of the operating rod 11 to thus cause downward movement of the conducting cross-bar 10. The movable contact 13 and operating rod 12 move downwardly to thereby substantially simultaneously establish a pressure-generating arc and an interrupting arc within the unit 7. During this time, the latch hooks 22 make latching engagement with the latch head 19 to thereby maintain the electrical circuit closed at the disconnect means 8. Arc extinction and consequent circuit interruption take place within the unit 7 in a manner set forth in the aforesaid Patent 2,406,469. Following interruption of the circuit, the cylindrical member 24 is moved downwardly sufficiently to effect rotation thereof to such an extent that the latch hooks 22 ride onto the flattened portions 20 of the latch head 19 to thus effect release of the movable disconnect contact 18.

The conducting cross-bar 10 carries the movable contact 13 and movable disconnect contact 18 with it downwardly to the fully open circuit position of the interrupter, as indicated by the dotted lines 37 in Fig. 1. The movable disconnect contact 30 is retrieved to its upper position by its retrieving spring 26.

During the closing operation, the movable contact 13 enters the unit 7 to make contacting engagement with the intermediate contact (not shown). Substantially simultaneously, the cross-bar 10 raises the operating rod 12 to rotate the pressure-generating contact (not shown) counterclockwise about the pivot 14 so that the pressure-generating contact strikes the intermediate contact at substantially the same time that the movable contact 13 strikes the intermediate contact to thereby complete the electrical circuit through the unit 7. Substantially simultaneously with the closure of the contact structure associated with the unit 7, the movable disconnect contact 18 makes contacting engagement with the movable disconnect contact 30, associated with the disconnect means 8, the compression spring 31 furnishing the requisite contact pressure. Also the latch hooks 22 reengage the latch head 19.

From the foregoing description, it will be apparent that the electrical circuit is completed at the unit 7 at substantially the same time it is completed at the disconnect means 8. Since the circuit at the disconnect means 8 closes through clear uncontaminated oil, the disconnect means 8 holds the voltage and thereby prevents excessive prestriking within the unit 7. Consequently, should the interrupter be rapidly reclosed and then immediately reopened, the oil within the unit 7 is not contaminated by prestriking during the closing stroke; thus interruption during the subsequent opening operation is not deleteriously affected.

Figs. 4 and 5 show a modified disconnect means 41. The modified disconnect means includes a conducting blade 42 pivotally mounted at 43 to the cross-bar 10. A compression spring 44 has its upper seat against an offstanding lug 45 secured to the rod 11, and its lower seat about a pin 46 integrally formed with the blade 42. In the closed circuit position, the blade 42 is disposed between opposed disconnect fingers 47, the latter being biased inwardly by compression springs 48. A flexible strap 49 has its ends riveted to the upper ends of the disconnect fingers 47, and its center portion secured by a bolt 50 to the lower end of the foot 17. Studs 51 have their interior ends threadedly secured to the disconnect fingers 47, and have stop caps 52 at their outer ends to limit the inward motion of the disconnect fingers 47. The compression springs 48 encircle the studs 51. The disconnect fingers 47 are pivotally mounted on pins 53, which are supported by downwardly extending portions 54 integrally formed with the foot 17. Pivotal rotation of the disconnect fingers 47 is thereby possible.

During the opening operation, the operating rod 11 moves downwardly to effect opening of the contact structure within the unit 7 in a manner as previously described. Meanwhile the blade 42 rotates at 43 about the cross-bar 10, the end 55 thereof being held by frictional engagement at the disconnect fingers 47. Finally, stop lug 56 strikes the lug 45, as shown by the dotted lines in Fig. 4. Then, and then only, is the end 55 of the blade 42 forced downwardly through the disconnect fingers 47 to separate therefrom. When the blade 42 is free of the disconnect fingers 47, it snaps to its lower position by reason of the compression spring 44. During the closing stroke, the blade 42 moves upwardly with the operating rod 11, the blade 42 being in its horizontal position. Thus, contact reclosure within the unit 7 takes place at substantially the same time as contact engagement at the disconnect means 41. The theory of operation is the same as that set forth in the interrupter of Fig. 1, there being shown in Figs. 4 and 5, merely a modified type of disconnect means.

Fig. 6 shows a modified type of arc-extinguishing unit, generally designated by the reference numeral 57. The passage formation is of the type set forth in the aforesaid Patent 2,406,469. The operating rod 12 has a flange 58 secured thereto, at the ends of which are apertures 59. Studs 60 pass through the apertures 59 and have pressure springs 61 encircling them. The upper end of each stud 60 is enlarged, as at 62, and makes pivotal connection at 63 to an actuating arm 64, which is integrally formed with the rotatable pressure-generating contact 65. There are two such arms 64, but only one is shown in Fig. 6. The rotatable pressure-generating contact 65 makes engagement with an intermediate contact 66 in the closed position of the interrupter, as shown in Fig. 6. Cooperable with the intermediate contact 66 is a lower movable contact 67, which is pivotally connected at 68 between a pair of links 69, the right-hand ends of which are pivotally connected at 70 to a pair of links 71, the upper ends of which are pivotally mounted at a stationary pivot 72. A pair of guide links 73 are pivotally connected at 74 intermediate the ends of the links 69. The left-hand ends of the guide links 73 are pivotally mounted at 75 to the lower ends of a pair of lugs 76 integrally formed with the lower casting plate 77 of the unit 57. This linkage is designed so that pin 68, carrying contact 67, moves vertically along substantially a straight line.

The links 69 are pivotally connected, by means of a stud 78, to the lower end of the operating rod 12. The stud 78 also passes through a pair of disconnect fingers 79, which make contacting engagement, in the closed circuit position as shown in Fig. 6, with the conducting cross-bar 10. The contacting portion 80 of the cross-bar 10, which makes engagement with the disconnect finger 79, has a configuration more clearly shown in Fig. 8. Referring to this figure, it is to be observed that the portion 80 is provided with shoulders 81, which hook on latching shoulders 82 integrally formed with the disconnect fingers 79.

The disconnect fingers 79 are biased together by compression springs 83 encircling the stud 78. A wedge 84 is mounted fixedly in place by any suitable means, such as a strap connection 85, the strap 85 extending between the lower walls 86 of the electrostatic shield 87. During the opening operation, after a predetermined downward travel of the operating rod 12, the wedge 84 engages two pins 88 jutting outwardly from the disconnect fingers 79 to thereby effect outward motion of the disconnect fingers 79 to cause release of the contacting portion 80. Prior to the aforesaid releasing action, there is a positive grip between the cross-bar 10 and the disconnect fingers 79.

A retrieving compression spring 89, mounted at the upper end of the operating rod 12 between a cap 90 secured thereto and a bracket 91 integrally formed with the top dome casting 92 of the unit 57, serves to reclose the contact structure within the unit 57 following release of the cross-bar 10 by the disconnect fingers 79.

From the foregoing description, it will be apparent that in the closed circuit position of the interrupter, partially shown in Fig. 6, the electrical circuit therethrough includes terminal stud 93, contact foot 94, top dome casting 92, pressure-generating contact 65, intermediate contact 66, lower movable contact 67 through a flexible strap 95 to the disconnect fingers 79 to the conducting cross-bar 10. The circuit then extends from the conducting cross-bar 10 through a similar interrupter assembly to a second terminal stud (not shown).

To open the electrical circuit passing through the interrupter, the operating rod 11 is moved downwardly by suitable means (not shown), to cause downward movement of the cross-bar 10. The downward movement of the cross-bar 10, by the hooked engagement at 81, 82, forcibly pulls the operating rod 12 downwardly. By the pivotal connections at 63 and 78, the lower movable contact 67 separates from the intermediate contact 66, at substantially the same time that the pressure-generating contact 65 separates from the intermediate contact 66, by virtue of the lost-motion provided by the compression spring 61 and stud 60. The contact structure opens to establish a pressure-generating arc and an interrupting arc, the pressure-generating arc forcing fluid, in this instance oil under pressure, toward the interrupting arc through passages 97 to effect the extinction thereof in a manner as described in the aforesaid Patent 2,406,469. During this time, the disconnect fingers 79 remain in electrical engagement with the cross-bar 10.

Following interruption of the circuit within the unit 57, the contact 67 and linkage 69, 73 assume the position as shown in dotted lines in Fig. 6, and the disconnect means are in the dotted line position of Fig. 8, at which time the pins 88 engage the wedge member 84 to cause release between the disconnect fingers 79 and the cross-bar 10. The retrieving spring 89 then immediately recloses the contact structure within the unit 57, and the cross-bar 10 continues downwardly to open a disconnect gap.

During the closing operation, the circuit is completed entirely externally of the units 57, the cross-bar 10 making engagement at the disconnect fingers 79. Thus, the circuit is completed through gaps interposed in clear uncontaminated oil which are able to stand considerable voltage and which minimize prestriking. Consequently, the oil within the unit 57 is not contaminated by prestriking and is in good condition for subsequent interruption, should immediate reopening of the interrupter be desired. Certain features of my invention concerning closing the circuit externally of the unit 57 are described and claimed in United States patent application, Serial No. 548,815, filed August 10, 1944, now United States Patent 2,456,926, issued December 21, 1948 to James M. Cumming, and assigned to the assignee of the instant application.

In certain instances it may not be necessary to have a positive engagement between the cross-bar 10 and the disconnect fingers 79, a simpler frictional engagement being sufficient, as illustrated by the disconnect contact structure shown in Fig. 7. In the disconnect contact structure of Fig. 7, no wedge 84 is employed, the shoulders 96 at the contact portion 80 of the cross-bar 10 providing the necessary holding action. When the contact structure is moved to its full open circuit position, the operating rod 12 is stopped in its downward movement by engagement of the cap 90 with the bracket 91 constituting stop means. At this time, the cross-bar 10 pulls free from the disconnect fingers 79 to interpose an isolating gap at the disconnect contacts 79. After the cross-bar 10 pulls free of the disconnect contacts 79, the retrieving spring 89 effects reclosure of the contact structure within the unit 57.

From the foregoing description of specific embodiments of my invention, it will be apparent that I have provided an improved circuit interrupter of the type especially adaptable for rapid reclosing service even where relatively high voltage is encountered, prestriking being greatly minimized by having the circuit closed through clean oil. In the structure set forth in Fig. 1, the contact tips in the grid and the disconnect means are arranged to touch at approximately the same time. Even if the grid 7 is contaminated with gas, the clean oil break on the other terminal will hold voltage until the contacts are practically closed.

In the aforesaid construction, practically no prestriking is obtained in the grid to make additional gas that might interfere with the second arc interruption. This means that all of the time between the interruption of the first arc and the parting of the contacts during the second arc, at least 20 cycles, will be available for getting rid of the gas in the grid and replacing it with clean oil for the second operation.

When only one interrupting unit is used per pole, no resistors are required for the purpose of voltage distribution. In the arrangement where the contact structure in the grid 57 is self-closing, two such interrupting units would normally be used. Full terminal potential will be brought down to the bottom of the grid assemblies when the main moving cross-bar 10 is in the full open position. This reduces the gradient on the insulation while the breaker is standing in the open position without requiring the resistors used for the purpose as set forth in the aforesaid Patent 2,406,469. The elimination of the resistor is desirable to avoid the contaminating effect of the residual resistor current being interrupted in the disconnect break. The arrangement set forth in Fig. 6 was tested successfully, opening 2000 amperes at 132,000 volts across two units 57 in series on a 20 cycle reclosing duty cycle. This means a first interruption followed by reclosing of the breaker within an interval of 20 cycles, or ⅓ second, after the initial tripping impulse, followed by an immediate second interruption of the short circuit. Because of substantial elimination of prestriking during the rapid reclosing operation, the second interruption was practically a duplication of the first.

Figs. 9 through 11 show a further embodiment of my invention incorporating certain design features, which are set forth and claimed in United States patent application, Serial No. 591,047, filed April 30, 1945, now Patent No. 2,534,920, Dec. 19, 1950, by Leon R. Ludwig and Benjamin P. Baker, and assigned to the assignee of the instant invention.

Referring to Fig. 11, which shows the complete interrupter of this modified type embodying my invention, the reference character 98 designates a base, which supports vertical structural members 99 braced by diagonally disposed members 100. The vertical structural members 99 support a platform 101 of structural steel, which is at ground potential and which supports in place a circuit interrupter of the single bushing type, the interior of which is shown more clearly in Fig. 9.

The circuit interrupter is generally designated by the reference numeral 102. It consists of a single high voltage terminal bushing 103, preferably of the high voltage paper-wound condenser type. To the lower end of the terminal bushing 103 is a guide 104, having diametrically disposed guide slots 105 and being clamped to the lower end of the terminal stud 106 at 107. A movable disconnect contact 108 telescopes within the guide 104 in the fully open circuit position of the interrupter.

The movable disconnect contact 108 is actuated by a pin 109, which passes therethrough, and to the ends of which are pivotally mounted a pair of insulating operating rods 110. The operating rods 110 have their upper ends mounted upon a pin 111, which passes through the left-hand end of a lever 112 pivotally mounted upon a stationary pivot 113. A compression spring 114 serves to bias the lever 112 in a clockwise direction toward the open circuit position.

An insulating cylinder 115 supports at its lower end a supporting framework 116, which is described in the aforesaid Patent 2,534,920. The supporting framework 116 supports terminal means 117, to which the line terminal 118 may be connected. The other terminal for the interrupter is designated by the reference numeral 119, and is disposed at the upper end of the bushing 103, through which the conducting means 120, including the terminal stud 106, extends. The framework 116 serves to support rigidly in place an arc-extinguishing unit 57, which is of the type described in Fig. 6, but which is here inverted. A frictional disconnect means of the type set forth in Fig. 7 is employed for effecting upward movement of the operating rod 12. The internal construction of the unit is the same as that set forth in Fig. 6, and the operation thereof is the same as previously described. In the interrupter under discussion, the operation thereof is effected by clockwise rotation of the lever 112, which moves the movable disconnect contact 108 upwardly into the guide 104, the pin 109 moving upwardly into the guide slots 105.

Thus, in this embodiment of my invention, I show an improved circuit interrupter of the single bushing type involving an arc-extinguishing unit having a reclosing contact structure disposed therein. In the open circuit position of the interrupter (not shown), the contact structure is reclosed within the unit 57, and the disconnect contact gap is entirely relied upon to hold the voltage. The circuit is closed during a closing operation entirely at the disconnect contacts, the movable disconnect contact 108 passing between the relatively stationary disconnect contact fingers 79, as shown more clearly in Fig. 10. Thus, the circuit is closed exteriorly of the unit 57 to prevent contamination of the fluid in the unit 57 due to prestriking.

Thus, in Fig. 9, I have shown novel mounting means for a circuit interrupter employing a novel arc-extinguishing unit 57 of the reclosing type, in which prestriking is prevented during the closing stroke by closing the circuit exteriorly of the unit. Thus, during reclosing operations, the fluid within the unit 57 has a longer time interval before a succeeding opening interruption to become free of gas, and at least partially replenished.

Fig. 12 shows a modified form of circuit interrupter embodying my invention, in which a disconnect means 8 is suspended from the foot 17 of a bushing 6 (not shown). Serially related with the disconnect means 8 is an arc-extinguishing unit 57 of the type set forth in Fig. 6. The operation of the unit 57 is identical to that set forth previously in connection with Fig. 6. However, in this form of my invention, I have added a flexible conductor 121 connecting the cross-bar 10 and the lower movable contact 67.

During the opening operation, the operating rod 11 is moved downwardly to consequently cause downward motion of the cross-bar 10. The contact structure within the arc-extinguishing unit 57 is opened, and the arcs drawn therein are interrupted in the manner described in connection with Fig. 6. The disconnect contact structure 8 is extended and unlatched in a manner similar to that set forth in the discussion relating to the disconnect means 8 of Fig. 2. The contact structure within the unit 57 recloses following unlatching of the contact portion 80 of the cross-bar 10 from the disconnect contact 79. There may merely be frictional contact between the contacting portion 80 of cross-bar 10 and the disconnect contact fingers 79 in a construction similar to that set forth in Fig. 7.

Following the unlatching of the disconnect fingers 79, the contact structure within the unit 57 is reclosed and the shunt 121 on the grid side puts all the voltage on the disconnect gap provided by the disconnect means 8.

During the closing operation, the final circuit is made at the disconnect contacts 18, 30. The shunt 121 protects the latch on the grid side from any arcing during the closing operation.

During rapid reclosing operations, the cross-bar 10 moves downwardly far enough for both the disconnect contacts 18, 30 and the contacting portion 80 of cross-bar 10 and the disconnect fingers 79 to be unlatched. Thus, during rapid reclosing operations, the circuit is made at the disconnect means 8, the shunt 121 relieving the disconnect contact fingers 79 from any arcing.

It will be observed that in the form of my invention set forth in Fig. 12 that I have provided an arc-extinguishing unit 57 of the type in which the contact structure is reclosed following arc interruption. All arcing is removed from the latching surfaces of the cross-bar 10 and disconnect contact fingers 79 by the provision of the flexible conductor 121. The voltage is entirely relieved from the grid 57 in the open circuit position, and during the closing operation the circuit is entirely made at the disconnect contact means 8 in a region of clear, uncontaminated oil to prevent prestriking.

Although I have shown and described specific structures, it is to be clearly understood that the same were merely for the purpose of illustration, and that changes and modifications may readily be made therein by those skilled in the art, without departing from the spirit and scope of the appended claims.

I claim as my invention:

1. In a circuit interrupter, an arc extinguishing unit, contact means including a pivotally mounted pressure-generating contact, an intermediate contact and a movable contact, an operating rod pivotally mounted adjacent one end thereof to the pivotally mounted pressure-generating contact, disconnect means including a pair of disconnect finger contacts operatively connected to the other end of the operating rod, linkage means interconnecting the other end of the rod to the movable contact, a movable disconnect contact member for causing limited following movement of the disconnect means, means biasing the contact means closed to effect contact closure following circuit interruption, the movable disconnect contact member making latching engagement with the disconnect finger contacts to cause said following movement of the disconnect finger contacts, means releasing the latching engagement following a predetermined opening movement of the operating rod, and the circuit being made during the closing stroke at the disconnect finger contacts.

2. A circuit interrupter of the liquid break type including a tank of arc extinguishing liquid, a pair of terminal bushings extending within the tank, an arc extinguishing unit depending from the interior end of one of the terminal bushings and immersed within the liquid, disconnect means secured to the interior end of the other terminal bushing, conducting means electrically connecting the arc extinguishing unit and the disconnect means in series in the closed circuit position, means causing the disconnect means to remain closed while the electrical circuit is being broken in the arc extinguishing unit during the opening operation, an insulating operating rod connected to the conducting means intermediate the ends thereof to cause the actuation thereof, and means causing the circuit to be made during the closing stroke at substantially the same time within the arc extinguishing unit as at the disconnect means.

3. A circuit interrupter of the liquid break type including a tank of arc extinguishing liquid, a pair of terminal bushings extending within the tank, an arc extinguishing unit depending from the interior end of one of the terminal bushings and immersed within the liquid, disconnect means secured to the interior end of the other terminal bushing, conducting means electrically connecting the arc extinguishing unit and the disconnect means in series in the closed circuit position, means causing the disconnect means to remain closed while the electrical circuit is being broken in the arc extinguishing unit during the opening operation, an insulating operating rod connected to the conducting means intermediate the ends thereof to cause the actuation thereof, means causing the circuit to be made during the closing stroke at substantially the same time within the arc extinguishing unit as at the disconnect means, the disconnect means including a pair of movable disconnect contacts, and means effecting retrieving motion of one of the movable disconnect contacts in a direction away from the other movable disconnect contact following opening of the disconnect means.

4. A circuit interrupter of the liquid break type including a tank of arc extinguishing liquid, a pair of terminal bushings extending within the tank, an arc extinguishing unit depending from the interior end of one of the terminal bushings and immersed within the liquid, disconnect means secured to the interior end of the other terminal bushing, a movable contact movable completely out of the arc extinguishing unit in the fully open circuit position of the interrupter, conducting means electrically interconnecting the movable contact and the disconnect means in series in the closed circuit position, an insulating operating rod secured to the conducting means intermediate the ends thereof to cause the actuation thereof, the disconnect means including a pair of movable disconnect contacts, means causing the pair of movable disconnect contacts to move together during the initial portion of the opening operation while the circuit is being opened within the arc extinguishing unit, means effecting the separation of the pair following extinction of the arc within the unit, and means effecting retrieving motion of one of the pair of disconnect contacts in a direction away from the other movable disconnect contact following separation of the pair of movable disconnect contacts.

5. A circuit interrupter of the liquid break type including a tank of arc extinguishing liquid, a pair of terminal bushings extending within the tank, an arc extinguishing unit secured to the interior end of one terminal bushing and immersed within the liquid, disconnect means secured to the interior end of the other terminal bushing and also immersed within the liquid, conducting means electrically interconnecting the arc extinguishing unit and the disconnect means in series, an insulating operating rod secured to the conducting means intermediate the ends thereof to cause the actuation thereof, and means maintaining the circuit closed at the disconnect means while the circuit is being opened within the arc extinguishing unit during the initial portion of the opening operation.

6. A circuit interrupter of the liquid break type including a tank of arc extinguishing liquid, a pair of terminal bushings extending within the tank, an arc extinguishing unit secured to the interior end of one terminal bushing and immersed within the liquid, disconnect means secured to the interior end of the other terminal bushing and also immersed within the liquid, conducting means electrically interconnecting the arc extinguishing unit and the disconnect means in series, an insulating operating rod secured to the conducting means intermediate the ends thereof to cause the actuation thereof, the disconnect means including a pair of movable disconnect contacts, means for effecting separation of the pair of movable disconnect contacts only following extinction of the arc within the arc extinguishing unit during the opening operation, means for retrieving one of the pair of movable disconnect contacts following separation of the pair of movable disconnect contacts, and the point of engagement of the pair during a subsequent closing operation being different than the point of separation thereof.

7. A circuit interrupter of the liquid break type including a tank of arc extinguishing liquid, a pair of terminal bushings extending within the tank, an arc extinguishing unit secured to the interior end of one terminal bushing and immersed within the liquid, disconnect means secured to the interior end of the other terminal bushing and also immersed within the liquid, a movable contact movable out of the arc extinguishing unit in the fully open circuit position of the interrupter, conducting means electrically interconnecting the movable contact in series with the disconnect means, an insulating operating rod secured to the conducting means intermediate the ends thereof to cause the actuation thereof, the disconnect means including a pair of movable disconnect contacts, means for effecting separation of the pair of movable disconnect contacts only following extinction of the arc within the arc extinguishing unit during the opening operation, means for retrieving one of the pair of movable disconnect contacts following separation of the pair of movable disconnect contacts, and the point of engagement of the pair during a subsequent closing operation being different than the point of separation thereof.

8. A circuit interrupter of the liquid break type including a tank of arc extinguishing liquid, a pair of terminal bushings extending within the tank, an arc extinguishing unit secured to the interior end of one terminal bushing and immersed within the liquid, disconnect means secured to the interior end of the other terminal bushing and also immersed within the liquid, the disconnect means including a pair of movable disconnect contacts positioned externally of the unit, conducting means electrically interconnecting the unit and the disconnect means in series in the closed circuit position, means for causing the pair of movable disconnect contacts to be latched together so as to move together during the initial portion of the opening operation, and means for releasing the pair of movable disconnect contacts at a predetermined point in the opening operation following extinction of the arc within the arc extinguishing unit.

9. In a circuit interrupter of the liquid break type, a tank filled with arc extinguishing liquid, two terminal bushings projecting within the tank, means defining an arc extinguishing unit supported at the interior end of one terminal bushing, disconnect means only supported at the interior end of the other terminal bushing, a conducting cross-bar having a portion thereof formed by a blade electrically interconnecting the unit and the disconnect means, means pivotally interconnecting the blade to the cross-bar, means for actuating the cross-bar and blade, and the blade being pivoted during the opening operation so that the disconnect means remains closed while the circuit is broken within the arc extinguishing unit.

10. In a circuit interrupter of the liquid break type, a tank filled with a liquid, two terminal bushings extending into the tank, an arc extinguishing unit depending from the lower end of one terminal bushing, disconnect means suspended from the lower end of the other terminal bushing, and a conducting cross-bar electrically interconnecting the unit and disconnect means in the closed circuit position.

11. In a circuit interrupter of the liquid break type, a tank filled with arc extinguishing liquid, two terminal bushings projecting within the tank, an arc extinguishing unit supported at the interior end of one terminal bushing including contact structure separable to establish an arc, disconnect means only supported at the interior end of the other terminal bushing, a conducting cross-bar electrically interconnecting the unit and the disconnect means in the closed circuit position, an operating rod connected to the cross-bar intermediate the ends thereof for causing actuation of the same, means for maintaining the circuit closed at the disconnect means during the time the circuit is being interrupted within the unit, and means effecting reclosure of the contact structure within the arc extinguishing unit following opening of the disconnect means.

12. In a circuit interrupter of the liquid break type, a tank filled with arc extinguishing liquid, two terminal bushings projecting within the tank, an arc extinguishing unit supported at the interior end of one terminal bushing, disconnect means only supported at the interior end of the other terminal bushing, a conducting cross-bar electrically interconnecting the unit and the disconnect means in the closed circuit position of the interrupter, contact structure associated with the unit, means for effecting reclosure of the contact structure within the unit in the fully open circuit position of the interrupter, means for maintaining the circuit closed at the disconnect means during the time the circuit is being interrupted within the unit, and a permanent shunt connection between the cross-bar and the contact structure.

13. In a circuit interrupter of the liquid break type, an arc extinguishing unit immersed in liquid, contact structure within the unit including a pressure-generating contact, an intermediate contact and a movable contact cooperable to establish two serially related arcs, an operating rod operatively connected to the pressure-generating contact at one end, a pair of disconnect fingers operatively connected to the rod adjacent its other end, a disconnect member making engagement with the disconnect fingers in the closed circuit position to cause actuation of the operating rod, means interconnecting the movable contact and the operating rod, means biasing the operating rod to its closed circuit position to effect contact closure following circuit interruption, and the disconnect member separating from the disconnect fingers in the fully open circuit position of the interrupter to insert an isolating gap in the circuit.

14. In a circuit interrupter of the liquid break type, a tank filled with a liquid, two terminal bushings extending into the tank, an arc extinguishing unit depending from the lower end of one terminal bushing, disconnect means suspended from the lower end of the other terminal bushing, a conducting cross-bar electrically interconnecting the unit and disconnect means in the closed circuit position, contact structure disposed within the unit separable to draw an arc, means maintaining electrical engagement at the disconnect means while the contact structure is separated within the unit to establish an arc, and means following opening of the disconnect means for reclosing the contact structure within the unit.

15. In a circuit interrupter of the liquid break type, a tank filled with arc extinguishing liquid, two terminal bushings projecting within the tank, an arc extinguishing unit supported at the interior end of one terminal bushing, contact means including an operating rod for establishing a pressure-generating arc and an interrupting arc within the unit, disconnect means only supported at the interior end of the other terminal bushing, a conducting cross-bar for electrically bridging the unit and the disconnect means in the closed circuit position, the cross-bar and the operating rod initially moving together during the opening operation, means effecting the release of the cross-bar from the operating rod, and biasing means for effecting retrieving movement of the operating rod following actuation of the releasing means to reclose the contact means within the unit.

16. In a circuit interrupter, an arc extinguishing unit, contact means including a pivotally mounted pressure-generating contact, an intermediate contact and a movable contact, an operating rod pivotally mounted adjacent one end thereof to the pivotally mounted pressure-generating contact, disconnect means including a pair of disconnect finger contacts operatively connected to the other end of the operating rod, linkage means interconnecting the other end of the rod to the movable contact, a movable disconnect contact member for causing limited following movement of the disconnect means, and means biasing the contact means closed to effect contact closure following circuit interruption.

17. In a circuit interrupter of the liquid break type, a tank filled with arc extinguishing liquid, an arc-extinguishing unit, means for immersing the arc-extinguishing unit in the liquid, contact structure separable to establish an arc within the unit, relatively stationary disconnect contact means, actuating means for causing the separation of the separable contact structure including the relatively stationary disconnect contact means, a movable disconnect contact member making engagement with the relatively stationary disconnect contact means in the closed circuit position of the interrupter, means for moving the movable disconnect contact member through the liquid away from the unit during the opening operation to provide an isolating gap in liquid in the fully open circuit position of the interrupter, means providing a short following movement of the relatively stationary disconnect contact means with the movable disconnect contact member during the initial portion of the opening operation to cause thereby operation of the actuating means and consequent separation of the contact structure, and means biasing the contact structure to the closed position following disengagement of the movable disconnect contact member from the relatively stationary disconnect contact means so that the electrical circuit may be closed exteriorly of the unit during the closing stroke.

18. In a liquid break circuit interrupter, an arc-extinguishing unit, means for immersing the unit in an arc-extinguishing liquid, contact structure separable to establish an arc within the unit, actuating means for causing the separation of the contact structure, a movable disconnect contact member movable away from the unit in the fully open circuit position of the interrupter to provide a disconnect gap in liquid, means providing limited following movement of the actuating means with the movable disconnect contact member during the initial portion of the opening operation to cause thereby separation of the contact structure and establishment of an arc within the unit, means biasing the contact structure to the completely closed circuit position following disengagement of the movable disconnect contact member from the actuating means, and the circuit being closed exteriorly of the unit during the closing stroke.

WINTHROP M. LEEDS.

REFERENCES CITED

The following references are of record in the file of this patent:

UNITED STATES PATENTS

| Number | Name | Date |
| --- | --- | --- |
| 1,809,232 | Bowie | June 9, 1931 |
| 1,868,482 | Austin | July 26, 1932 |
| 2,477,788 | Cumming | Aug. 2, 1949 |